United States Patent
Singh et al.

(10) Patent No.: US 8,510,802 B1
(45) Date of Patent: Aug. 13, 2013

(54) HOME NETWORK ACCESS NODE USAGE PREVENTION BY BLOCKING ACCESS NODE ENTRIES IN A PREFERRED ROAMING LIST

(75) Inventors: Jasinder Pal Singh, Olathe, KS (US); Keith E. Moll, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 55 days.

(21) Appl. No.: 13/330,215

(22) Filed: Dec. 19, 2011

(51) Int. Cl.
*G06F 21/00* (2006.01)

(52) U.S. Cl.
USPC .......................................................... 726/3

(58) Field of Classification Search
USPC ........................ 726/2, 3; 713/161; 455/432.1
See application file for complete search history.

(56) References Cited

U.S. PATENT DOCUMENTS

| | | | |
|---|---|---|---|
| 7,702,329 | B1 | 4/2010 | Durig et al. |
| 7,835,698 | B2 | 11/2010 | Eyuboglu et al. |
| 2006/0079224 | A1* | 4/2006 | Welnick et al. ............ 455/432.1 |
| 2009/0245176 | A1 | 10/2009 | Balasubramanian et al. |
| 2010/0279689 | A1* | 11/2010 | Tinnakornsrisuphap et al. ........................... 455/435.2 |
| 2011/0217977 | A1* | 9/2011 | Du et al. .................... 455/432.1 |

* cited by examiner

*Primary Examiner* — Brandon Hoffman
*Assistant Examiner* — Anthony Brown

(57) ABSTRACT

Embodiments disclosed herein provide systems and methods for blocking the use of a PRL by a wireless device to access nodes of a network controller. In a particular embodiment, a method provides receiving an access request for the wireless device to access the home wireless network and transferring an authentication request for the wireless device to an authentication system. The method further provides the authentication system receiving the authentication request, determining that the wireless device should not be allowed to access the home wireless network, and transferring a negative authentication response to the network controller. In response to receiving the authentication response, the method provides the network controller transferring a negative access response to the wireless device. In response to receiving the access response, the method provides the wireless device blocking the use of a Preferred Roaming List by the wireless device to access nodes of the network controller.

20 Claims, 7 Drawing Sheets

100

HOME NETWORK ACCESS NODE USAGE PREVENTION BY BLOCKING ACCESS NODE ENTRIES IN A PREFERRED ROAMING LIST

TECHNICAL BACKGROUND

Authorization systems in wireless communication networks maintain information concerning whether a wireless device should be allowed to access a wireless communication network. For example, an authorization system may track whether the payments for a service plan of a wireless device are up to date or whether service limits of the service plan have been reached in order to make a determination as to whether the wireless device should receive authorization to access a wireless network. If the authorization system determines that the wireless device is authorized to access the wireless network, then the wireless device may proceed to exchange communications with the wireless network. However, if the authorization system determines that the wireless device is not authorized to access the wireless network, then the wireless device may continue to request access and be denied access to the wireless network. Even though wireless network access is denied, these repeated requests still use resources of the wireless network.

The wireless device is able to request access to the wireless network through wireless access nodes for the wireless network. The wireless device finds and transfers access requests to these access nodes using information found in a preferred roaming list (PRL). The PRL may contain entries for access nodes of multiple wireless networks. If the entries for access nodes of a particular wireless network are not listed in the PRL, then the wireless device will be unable to communicate with that wireless network regardless of whether the wireless device would be allowed to access that wireless network.

OVERVIEW

Embodiments disclosed herein provide systems and methods for blocking the use of a PRL by a wireless device to access nodes of a network controller. In a particular embodiment, a method provides, in a network controller that serves a geographic area of a home wireless communication network where a wireless communication device is located, receiving an access request for the wireless communication device to access the home wireless communication network and transferring an authorization request for the wireless communication device to an authentication system. The method further provides, in the authentication system, receiving the authentication request, determining that the wireless communication device should not be allowed to access the home wireless communication network, and transferring an authentication response to the network controller indicating that the wireless communication device is not authorized to access the home wireless communication network. The method further provides, in the network controller, in response to receiving the authentication response, transferring an access response to the wireless communication device that indicates that the wireless communication device is not authorized to access the home wireless communication network. The method further provides, in the wireless communication device, in response to receiving the access response, blocking the use of a Preferred Roaming List (PRL) by the wireless communication device to access nodes of the network controller.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
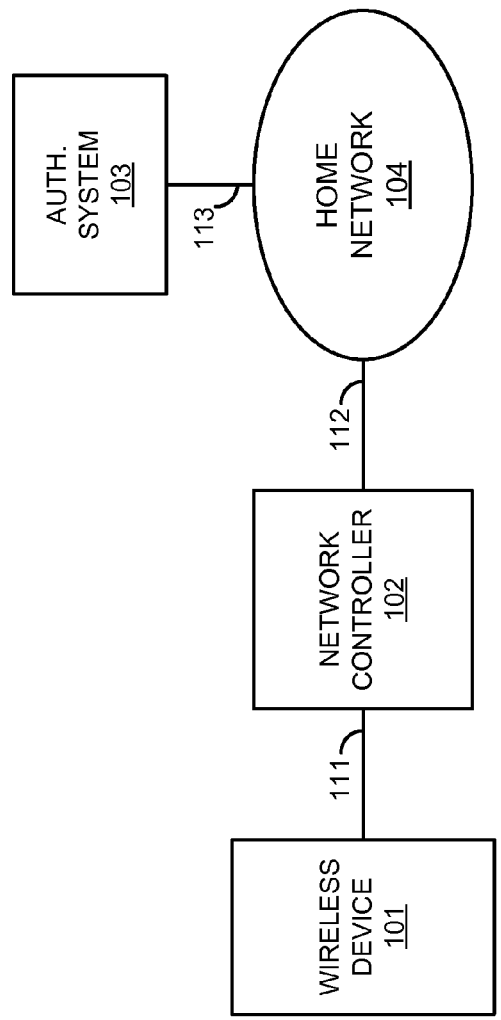
FIG. 1 illustrates a wireless communication system for blocking the use of a PRL by a wireless device to access nodes of a network controller.

FIG. 1 illustrates wireless communication system 100 for blocking the use of a PRL by a wireless device to access nodes of a network controller. Wireless communication system 100 includes wireless communication device 101, network controller 102, authentication system 103, and home wireless communication network 104. Wireless communication device 101 and network controller 102 communicate over wireless link 111. Network controller 102 and home wireless network 104 communicate over communication link 112. Home wireless network 104 and authentication system 103 communicate over communication link 113.

In operation, when wireless device 101 attempts to exchange communications with a wireless communication network, wireless device 101 uses a preferred roaming list (PRL) to find access nodes that facilitate communication exchanges with wireless communication networks, such as home wireless network 104. A PRL includes information necessary for a wireless device to attempt to exchange communications with an access node. For example, each entry in a PRL for an access node may include the frequency bands, sub bands, and a service provider identifier associated with the access node.

Entries for access nodes in the PRL stored on wireless device 101 are sorted so that a wireless device attempts to connect to access nodes of home wireless network 104 before attempting to connect to access nodes of a visited wireless network. The PRL gives preference to access nodes of home wireless network 104 because wireless device 101 is associated with home wireless network 104. Wireless device 101 may be associated with home wireless network 104 because a user, employer of the user, etc., of wireless device 101 is a customer of services provided by home wireless network 104. Access nodes of home wireless network 104 are preferred because the operator of home wireless network 104 may have less control over the service provided to wireless device 101 when wireless device 101 is communicating with a visited wireless network, wireless network 104 may be charged by a visited wireless network for allowing wireless device 101 to access the visited wireless network, or any other reason why access nodes on home wireless network 104 would be preferred over those on a visited wireless network.

Therefore, when wireless device 101 begins the process of connecting with a wireless access node, wireless device 101 first attempts to connect with a wireless access node of home wireless network 104 in accordance with the PRL stored on wireless device 101. These access attempts by wireless device 101 use network resources, such as processing capacity of network controller 102, regardless of whether the wireless device 101 is allowed to access home wireless network 102 in response to the access attempt.

Figure 2:
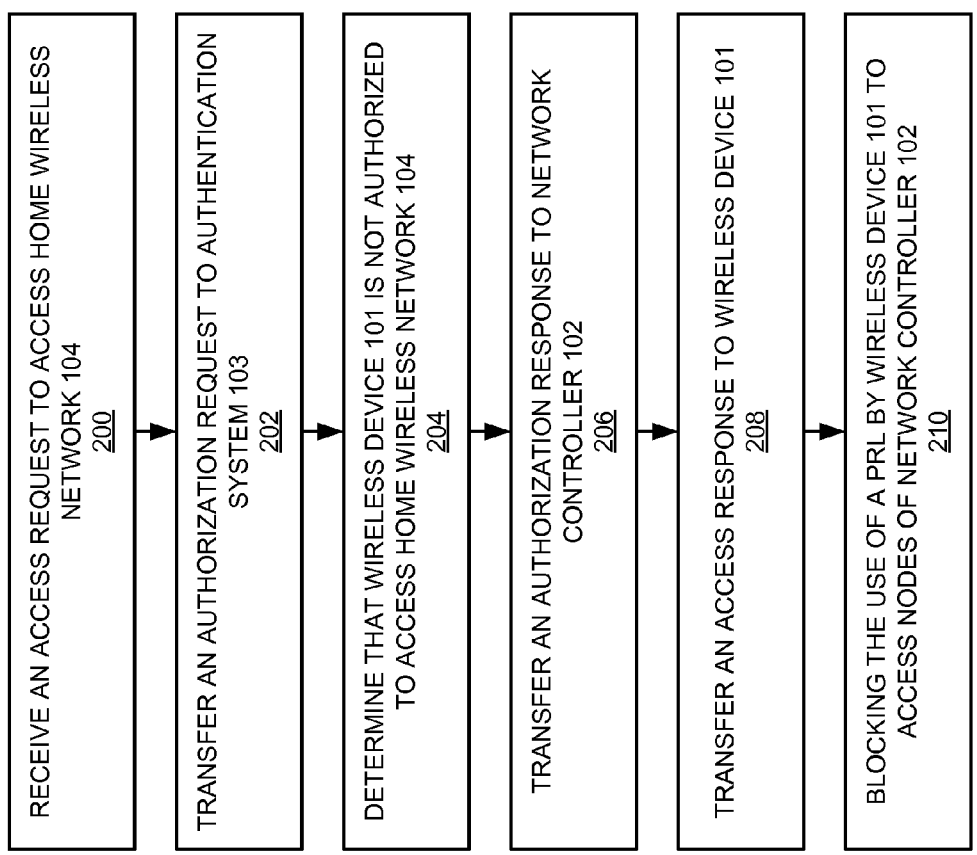
FIG. 2 illustrates the operation of the wireless communication system for blocking the use of a PRL by a wireless device to access nodes of a network controller.

FIG. 2 illustrates the operation of wireless communication system 100 for blocking the use of a PRL by a wireless device to access nodes of a network controller. In operation, network controller 102 controls and provides service to one or more access nodes in a geographic area covered by home wireless network 104 where wireless device 101 is located. Network controller 102 may be a base station controller, a mobile switching center, or any other type of network controller. When wireless device 101 attempts to access home wireless network 104, network controller 102 receives an access request for wireless device 101 to access home wireless network 104 (step 200). Wireless device 101 transfers the access request to network controller 102 via one of the access nodes controlled by network controller 102 that wireless device 101 is able access using access node information found in a PRL stored on wireless device 101.

After receiving the access request from wireless device 101, network controller 102 transfers an authentication request for wireless device 101 to authentication system 103 (step 202). Authentication system 103 may include billing information for wireless device 101, service plan information for wireless device 101, or any other type of information relevant to ability of wireless device 101 to access home wireless network 104.

In this example, authentication system 103 receives the authentication request and determines that wireless device 101 should not be allowed to access home wireless network 104 (step 204). Wireless device 101 may not be authenticated because the service account associated with wireless device 101 is past due on billing payments, a service limit has been reached, the service account with wireless device 101 may have been canceled, or for any other reason why a wireless device may not be authorized to access a home wireless network. In other examples, authentication system 103 may determine that wireless device 101 should be allowed to access home wireless network 104.

Authentication system 103 transfers an authentication response to network controller 102 indicating that wireless device 101 is not allowed to access home wireless network 104 (step 206). The authentication response may be any type of signaling or message that an authentication system may use to report that a wireless device is not authorized to communicate with home wireless network 104.

In response to receiving the authentication response, network controller 102 transfers an access response to wireless device 101 indicating that wireless device 101 is not authorized to access home wireless network 104 (step 208). The access response may be any type of signal or message that a network controller may use to indicate to a wireless device that the wireless device is not authorized to access a wireless network. In some embodiments, the access response may include an indicator, such as a flag, that provides an additional indication that wireless device 101 is a rogue device that will not be allowed to access home wireless network 104.

In response to receiving the access response, wireless device 101 blocks the use of a PRL by the wireless communication device to access nodes of the network controller (step 210). Wireless device 101 may block the use of the PRL by deleting the entries in the PRL for access nodes controlled by network controller 102, by marking the entries in a manner so as wireless device 101 does not use the entries, by moving the entries from the PRL to a storage area on wireless device 101 where the entries cannot be used by wireless device 101 to connect to the access nodes of network controller 102, or by otherwise preventing the use of the entries by wireless device 101 to connect to the access nodes of network controller 102. Wireless device 101 may have a software element, such as an application that executes on wireless device 101 or code that is part of the firmware of wireless device 101, which recognizes the access response or an indicator in the access response and performs the blocking functionality on the PRL of wireless device 101.

Since only the entries for access nodes of network controller 102 are blocked, wireless device 101 may still use entries in the PRL for access nodes of a visited wireless network to attempt to connect to the visited wireless network. When wireless device 101 attempts to connect to the visited wireless network, the visited wireless network will still query authentication system 103 to determine whether the visited wireless network should allow access to wireless device 101. At that time authentication system 103 will indicate to the visited wireless network that wireless device 101 should not be allowed access to visited wireless network. Therefore, after blocking the entries for access nodes of network controller 102 on the PRL, wireless device 101 can continue to request network access through a visited wireless network without using the resources of network controller 102 and other elements of home wireless network 104, such as the access nodes of network controller 102.

In some embodiments, if authentication system 103 determines that wireless device 101 is allowed to access home wireless network 104, then the authorization and access responses will indicate to wireless device 101 that wireless device 101 is allowed to access home wireless network 104. After receiving the access response, wireless device 101 does not block entries in the PRL and exchanges communications with home wireless network 104.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Network controller 102 comprises a computer system and communication interface. Network controller 102 may also include other components such a router, server, data storage system, and power supply. Network controller 102 may reside in a single device or may be distributed across multiple devices. Network controller 102 is shown externally to home wireless network 104, but controller 102 could be integrated within the components of home wireless network 104. Network controller 102 could be a mobile switching center, network gateway system, Internet access node, application server, service node, or some other communication system—including combinations thereof.

Authentication system 103 comprises a computer system and communication interface. Authentication system 103 may also include other components such as a router, server, data storage system, and power supply. Authentication system 103 may reside in a single device or may be distributed across multiple devices. Authentication system 103 is shown externally to home wireless network 104, but system 103 could be integrated within the components of home wireless network 104. Authentication system 103 could be a network gateway system, Internet access node, application server, service node, or some other communication system—including combinations thereof.

Home wireless communication network 104 comprises network elements that provide communications services to wireless device 101 through network controller 102. Home wireless communication network 104 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 112-113 use metal, glass, air, space, or some other material as the transport media. Communication links 112-113 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 112-113 could be direct links or may include intermediate networks, systems, or devices.

Figure 3:
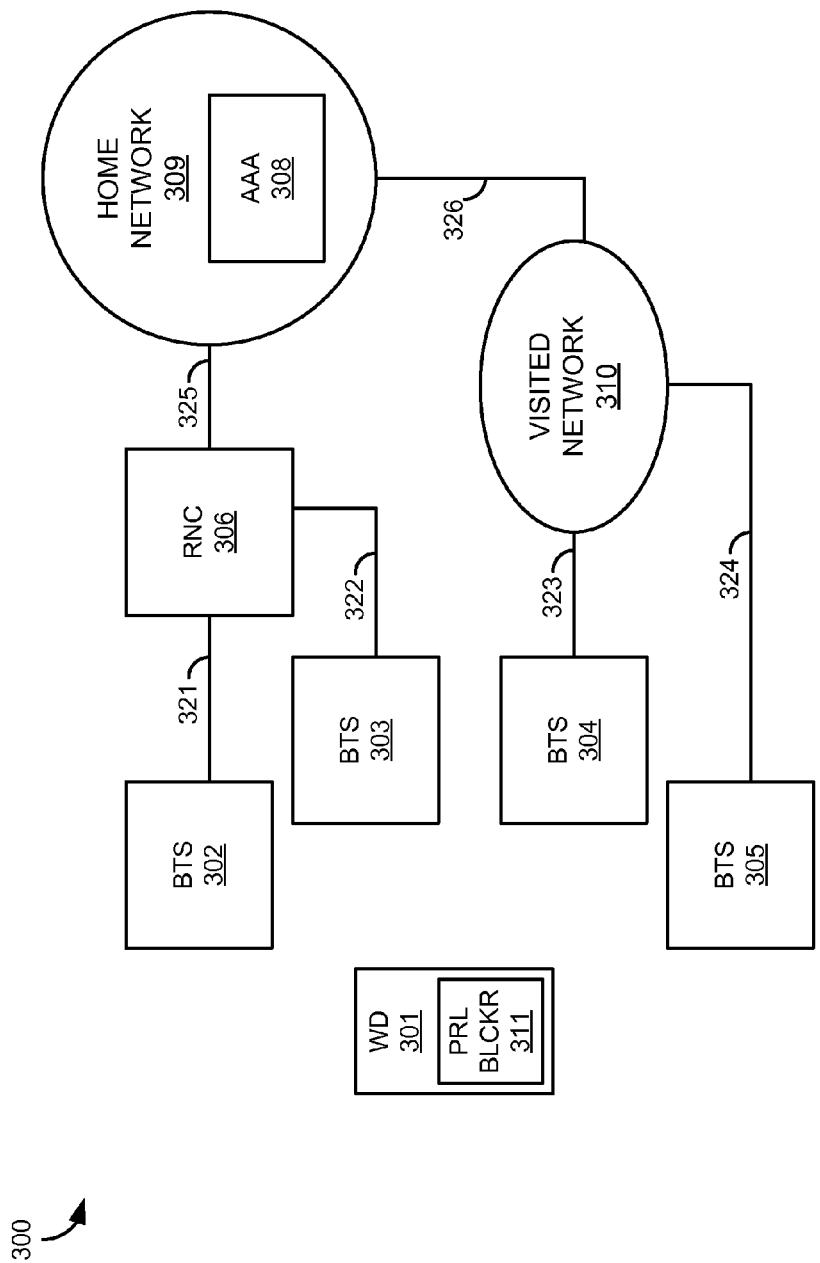
FIG. 3 illustrates a wireless communication system for blocking the use of a PRL by a wireless device to access nodes of a network controller.

FIG. 3 illustrates wireless communication system 300 for blocking the use of a PRL by a wireless device to access nodes of a network controller. Wireless communication system 300 includes wireless communication device 301, base transceiver stations (BTSs) 302-305, radio network controller (RNC) 306, authentication, authorization, and accounting system (AAA) 308, home wireless communication network 309, and visited wireless communication network 310. PRL blocking software 311 is executing on wireless communication device 301.

RNC 306 controls BTSs 302 and 303 and may control other BTSs not shown in FIG. 3 for clarity. The BTSs controlled by RNC 306 cover a geographic area, such as a city, county, state, region, or any other geographic area designation, large or small, which may be limited by the wireless signal range of the BTSs themselves. Home wireless network 309 may include other RNCs that control BTSs in geographic areas outside of the geographic area covered by RNC 306. BTSs 304 and 305 may also be controlled by an RNC of visited network 310 although the RNC is not shown in FIG. 3 for clarity.

Figure 4:
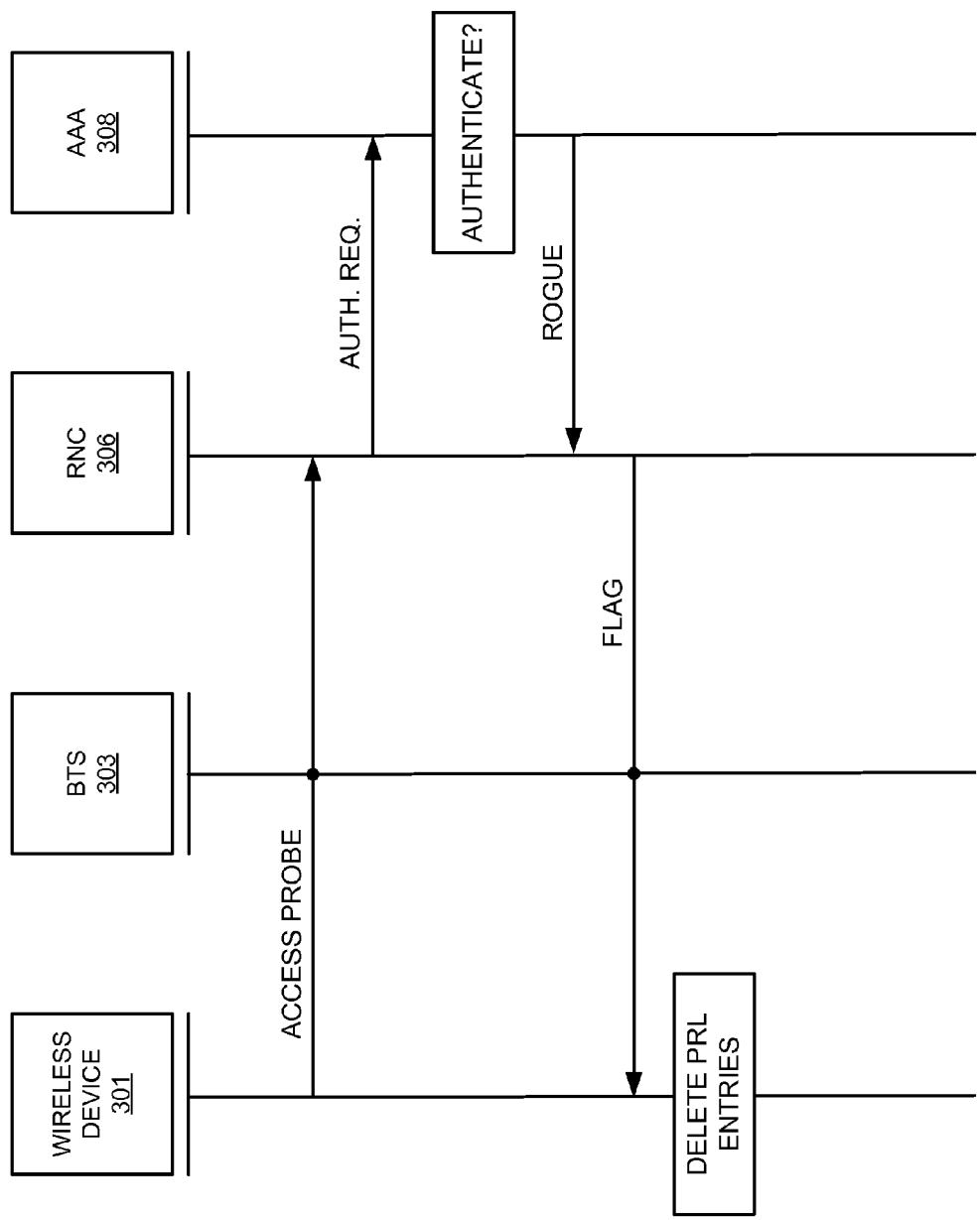
FIG. 4 illustrates the operation of the wireless communication system for blocking the use of a PRL by a wireless device to access nodes of a network controller.

FIG. 4 illustrates the operation of wireless communication system 300 for blocking the use of a PRL by a wireless device to access nodes of a network controller. In operation, wireless device 301 is located in the geographic area covered by the BTSs controlled by RNC 306. Wireless device 301 attempts to access home wireless network 309 by referencing a PRL stored on wireless device 301. The PRL indicates to wireless device 301 that wireless device 301 should use BTS 303 to request access to home wireless network 309. Wireless device 301 then uses the information provided by the PRL to transfer an access probe to RNC 306 via BTS 303.

In response to receiving the access probe, RNC 306 transfers an authentication request to AAA 308 so that AAA 308 can inform RNC 306 about whether to allow wireless device 301 to access home wireless network 309. AAA 308 receives the authentication request and determines whether to authenticate wireless device 301 in order to allow wireless device 301 to access home wireless network 309. In this example, in response to receiving the authentication request, AAA 308 determines that wireless device 301 is not allowed to access home wireless network 309. Upon making this determination, AAA 308 further designates wireless device 301 as a rogue device. AAA 308 may make this designation after a single failed authentication request from wireless device 301 as shown in FIG. 4.

Alternatively, AAA 308 may make the rogue designation after a number of authentication requests for wireless device 301 are denied. In that case, wireless device 301 will only be designated a rogue device if wireless device 301 continues to transfer access probes to RNC 306 through either BTS 302 or 303 that are denied authentication by AAA 308.

After AAA 308 designates that wireless device 301 is a rogue device, AAA 308 transfers a message to RNC 306 indicating that wireless device 301 is a rogue device. In turn, RNC 306 transfers an acknowledgment message to the access probe that, in addition to indicating that wireless device 301 is not allowed to access home wireless network 309, includes a rogue device flag indicating that wireless device 301 is a rogue device. The rogue device flag will indicate to PRL blocking software 311 that PRL blocking software 311 should delete entries in the PRL for BTSs of RNC 306. Hence, actions performed in response to wireless device 301 receiving the rogue device flag will prevent wireless device 301 from continuing to request network access through BTS 302 or 303.

Wireless device 301 receives the acknowledgment message and, upon receiving the acknowledgment message, PRL blocking software 311 recognizes the flag in the acknowledgment message. In response to recognizing the flag, PRL blocking software deletes the entries of BTSs controlled by RNC 306, including BTSs 302 and 303, from the PRL of wireless device 301.

Figure 5:
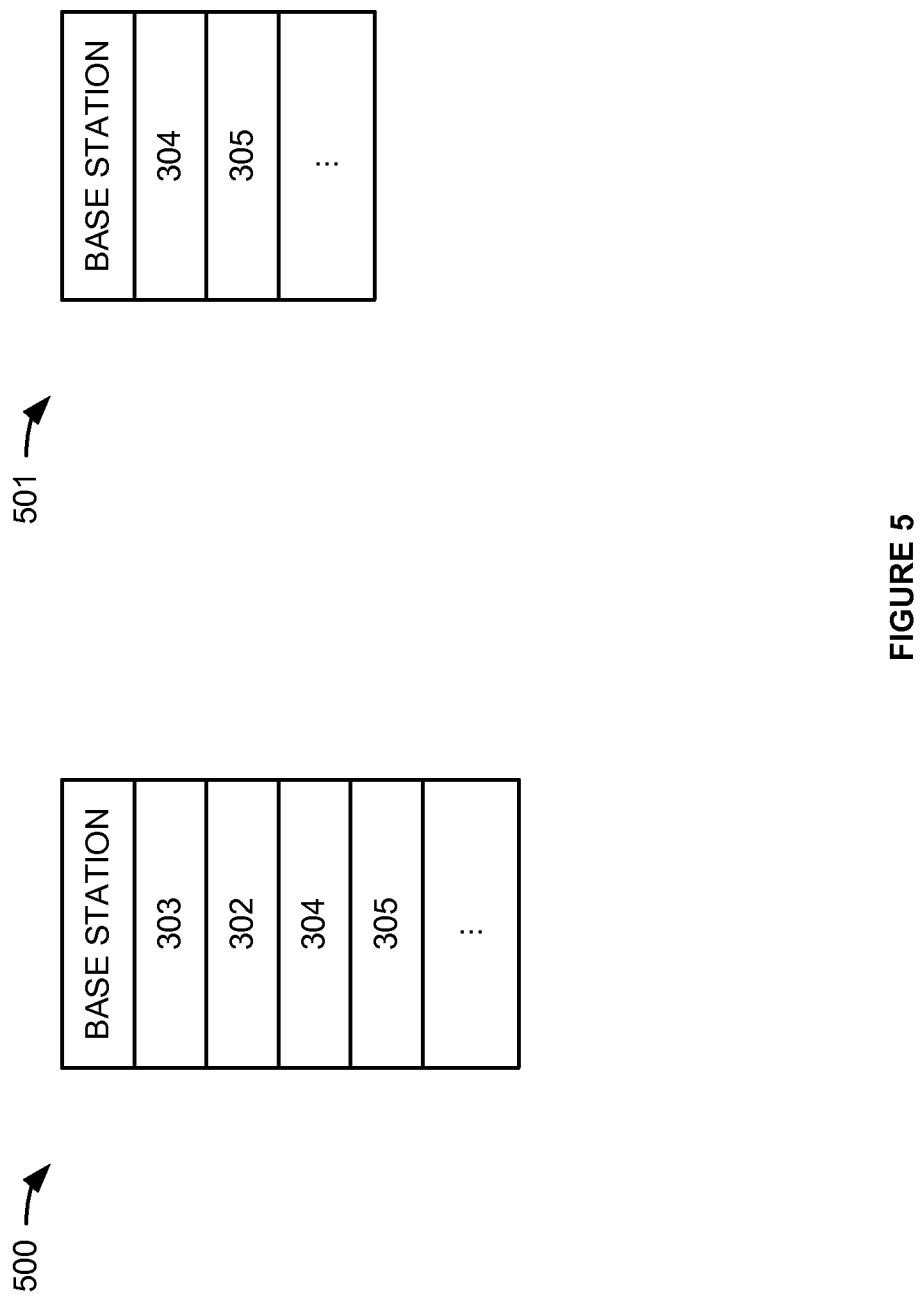
FIG. 5 illustrates example PRLs used when blocking the use of a PRL by a wireless device to access nodes of a network controller.

FIG. 5 illustrates example PRLs for wireless device 301 before and after PRL blocking software deletes the entries of the BTSs controlled by RNC 306. A BTS number corresponding to the BTSs of FIG. 3 signifies entries in each PRL. It should be understood that each entry may include the frequency bands, sub bands, and a service provider identifier associated with the indicated BTS, or any other information about BTSs to which wireless device 301 may connect.

PRL 500 is an example of the PRL stored on wireless device 301 with all entries intact. BTSs 303 and 302 of home wireless network 309 are listed first so that wireless device 301 at its current location will attempt to access home wireless network 309 before attempting to access visited wireless network 310. PRL 500 may include further entries of BTSs for both RNC 306 and of visited wireless network 310 that are not shown. These additional BTSs may cover locations further away from the current location of wireless device 301 and, therefore, are not preferred for communications over those listed at the top of PRL 500.

After PRL blocking software 311 recognizes the flag in the acknowledgment message from RNC 306, PRL blocking software 311 deletes the entries in PRL 500 for BTSs 302, 303, and any other BTS of RNC 306. PRL 501 is a resulting PRL containing entries for only the BTSs of visited wireless network 310. In other embodiments, instead of deleting the entries, PRL blocker 311 may simply move the entries for BTSs 302 and 303 out of PRL 500 for later retrieval, may mark the entries for BTSs 302 and 303 in a manner so as wireless device 301 does not use the entries, or may otherwise prevent wireless device 301 from accessing entries for BTSs 302 and 303.

Once PRL blocking software 311 has deleted the entries for BTSs 302 and 303, wireless device 301 will only be able to request access on a roaming basis to visited wireless network 310 via BTSs 304 and 305. As far as wireless device 301 is concerned, BTSs 302 and 303 do not exist because they are not indicated in PRL 501. Upon making the access request to visited wireless network 310, visited wireless network 310 will query AAA 308 to determine whether wireless device 310 is allowed to roam on visited wireless network 310. Unless the status of wireless device 310 has changed in AAA 308, AAA 308 will notify visited wireless network 310 that wireless device 301 is not allowed to roam on visited wireless network 310.

Wireless device 301 may continue transfer access attempts to visited wireless network 310 and continue to be denied access to visited wireless network 310 by AAA 308. If the entries for BTSs 302 and 303 had not been deleted from PRL 500, then wireless device 301 would continue to use resources of BTSs 302 and 303, RNC 306, and other elements of home wireless network 309 as these access attempts to persist. Instead, using PRL 501 frees up the resources so that the resources can be used to service wireless devices that are allowed to access home wireless network 309.

Figure 6:
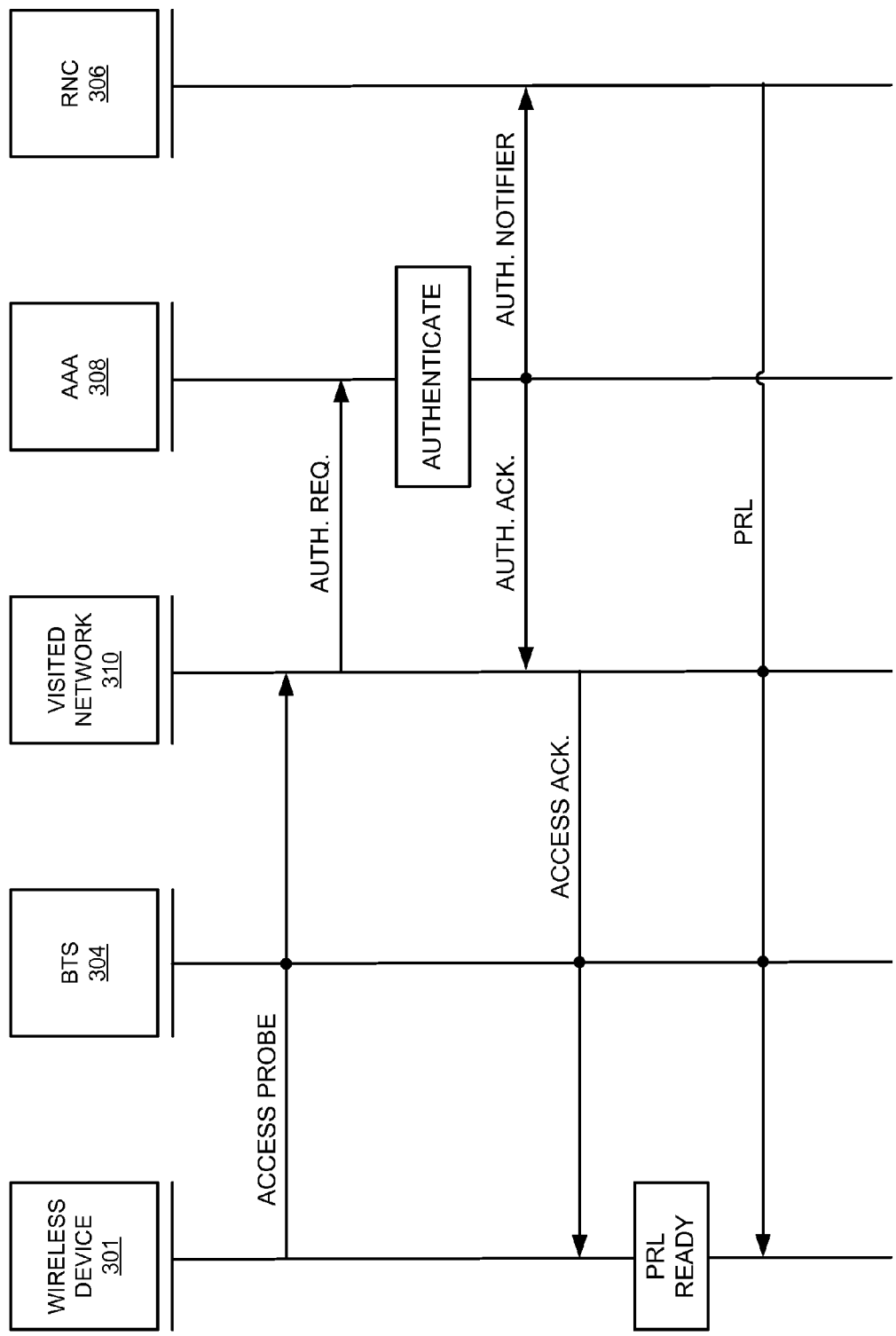
FIG. 6 illustrates the operation of the wireless communication system for blocking the use of a PRL by a wireless device to access nodes of a network controller.

FIG. 6 illustrates the operation of wireless communication system 300 for unblocking the use of a PRL by a wireless device to access nodes of a network controller. As described above, once entries for BTSs 302 and 303 deleted from the PRL of wireless device 301, wireless device 301 may continue to transfer access probes to BTSs of visited wireless network 310. In this example, wireless device 301 transfers an access probe to visited wireless network 310 through BTS 304 because BTS 304 is the preferred BTS in accordance with PRL 501. In response to the access probe, visited wireless network 310 transfers an authorization request to AAA 308.

At some point before AAA 308 receives the authorization request, the status of wireless device 301 may change in AAA 308, which now indicates that wireless device 301 is no longer a rogue device and allows wireless device 301 to receive wireless network access. For example, delinquent billing payments that caused the PRL entries to be deleted may have been satisfied for the service plan account of wireless device 301. Therefore, instead of continuing to deny authorization for wireless device 301 to access visited wireless network 310, AAA 308 transfers an acknowledgment message to visited wireless network 310 indicating the wireless device 301 is authorized for access to visited wireless network 310. Similarly, AAA 308 may transfer a notifier to RNC 306 indicating that wireless device 301 is no longer a rogue device.

In response to receiving the authentication acknowledgment, visited wireless network 310 transfers an access acknowledgment message that indicates to wireless device 301 that wireless device 301 is allowed to access visited wireless network 310. Wireless device 301 can then exchange communications with visited wireless network 310 through BTS 304. Additionally, PRL blocking software 311 recognizes that wireless device 301 has been allowed to obtain network access and is no longer a rogue device. Responsively, PRL blocker 311 is ready to receive a new PRL that replaces the entries for access nodes of RNC 306 that were deleted. RNC 306 may transfer the new PRL through visited wireless network 310 in response to receiving the notifier from AAA 308 or PRL blocker 311 may transfer a request for the new PRL to RNC 306 through visited wireless network 310. The new PRL may include only the entries of BTSs 302, 303, and any other BTS of RNC 306 that was deleted or the new PRL may be a complete replacement PRL that includes both the deleted entries and the entries that were not deleted.

Upon receiving the new PRL, PRL blocking software 311 updates the PRL stored on wireless device 301 so that wireless device 301 can once again access home wireless network 309 via BTSs 302 and 303 using entries in the PRL for BTSs 302 and 303.

Figure 7:
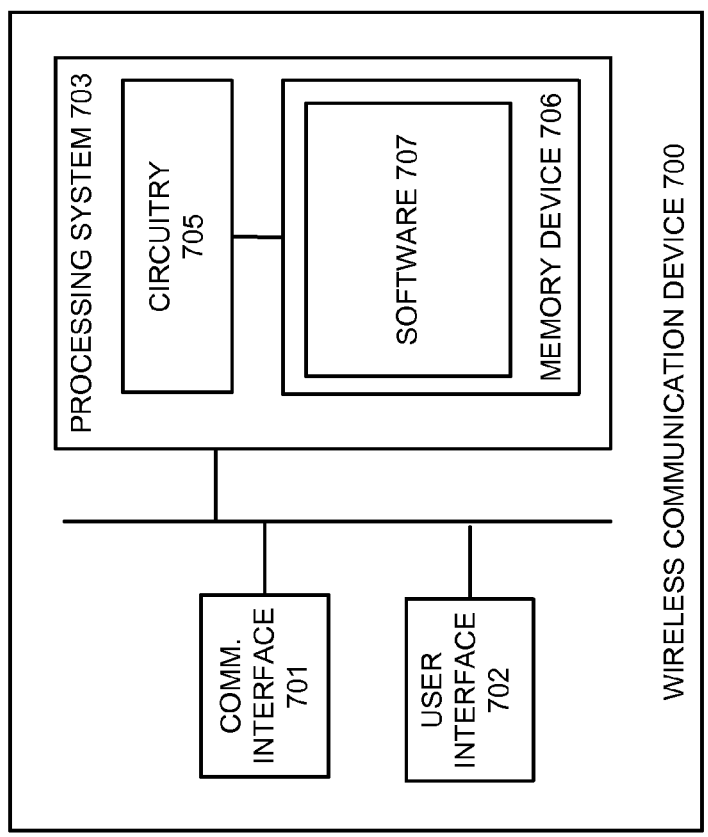
FIG. 7 illustrates a wireless communication device for blocking the use of a PRL by a wireless device to access nodes of a network controller.

FIG. 7 illustrates wireless communication device 700. Wireless communication device 700 is an example of wireless communication device 101, although device 101 could use alternative configurations. Wireless communication device 700 comprises wireless communication interface 701, user interface 702, and processing system 703. Processing system 703 is linked to wireless communication interface 701 and user interface 702. Processing system 703 includes processing circuitry 705 and memory device 706 that stores operating software 707. Wireless communication device 700 may include other well-known components such as a battery and enclosure that are not shown for clarity. Wireless communication device 700 may be a telephone, computer, e-book, mobile Internet appliance, media player, game console, wireless network interface card, or some other wireless communication apparatus—including combinations thereof.

Wireless communication interface 701 comprises RF communication circuitry and an antenna. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols, such as CDMA, EVDO, WIMAX, GSM, LTE, WIFI, HSPA, or some other wireless communication format.

Wireless communication interface 701 is configured to transfer an access request for wireless communication device 700 to access a home wireless communication network where wireless communication device 700 is located, wherein a network controller that serves a geographic area of the home wireless communication network receives the access request and transfers an authentication request for the wireless communication device to an authentication system, wherein the authentication system receives the authentication request, determines that wireless communication device 700 should not be allowed to access the home wireless communication network, and transfers an authentication response to the network controller indicating that wireless communication device 700 is not authorized to access the home wireless communication network, and wherein, in response to receiving the authentication response, the network controller transfers an access response to wireless communication device 700 that indicates that wireless communication device 700 is not authorized to access the home wireless communication network. Wireless communication interface 701 is further configured to receive the access response from the network controller.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 may include an operating system, utilities, drivers, network interfaces, applications, or some other type of software. When executed by processing circuitry 705, operating software 707 directs processing system 703 to operate wireless communication device 700 as described herein. In particular, operating software 707 directs processing system 703 to block the use of a PRL by wireless communication device 700 to access nodes of the network controller.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:
   in a network controller that serves a geographic area of a home wireless communication network where a wireless communication device is located, receiving an access request for the wireless communication device to access the home wireless communication network and transferring an authorization request for the wireless communication device to an authentication system;
   in the authentication system, receiving the authorization request, determining that the wireless communication device should not be allowed to access the home wireless communication network, and transferring an authentication response to the network controller indicating that the wireless communication device is not authorized to access the home wireless communication network;
   in the network controller, in response to receiving the authentication response, transferring an access response to the wireless communication device that indicates that the wireless communication device is not authorized to access the home wireless communication network; and
   in the wireless communication device, in response to receiving the access response, blocking the use of a Preferred Roaming List (PRL) by the wireless communication device to access nodes of the network controller.

2. The method of claim 1, wherein blocking the use of the PRL comprises deleting entries in the PRL for the access nodes of the network controller.

3. The method of claim 1, further comprising:
   in the network controller, in response to a determination that the wireless communication device is authorized to access the home wireless communication network, wherein the determination occurs at a time after the access response is transferred, transferring a message to the wireless communication device that indicates that the wireless communication device can access the home wireless communication network;
   in the wireless communication device, in response to receiving the message, unblocking the use of the PRL by the wireless communication device to access nodes of the network controller.

4. The method of claim 3, wherein blocking the use of the PRL comprises deleting entries in the PRL for the access nodes of the network controller and unblocking the use of the PRL comprises, in the wireless communication device, receiving the entries in the PRL for the access nodes of the network controller that were previously deleted.

5. The method of claim 4, wherein the entries in the PRL are received over a visited wireless communication network.

6. The method of claim 1, wherein blocking the use of the PRL comprises preventing the wireless communication device from accessing entries in the PRL for the access nodes of the network controller.

7. The method of claim 1, wherein blocking the use of the PRL is performed by an application executing on the wireless communication device.

8. The method of claim 1, further comprising:
   in the wireless communication device, requesting access to a visited wireless communication network via an unblocked access node in the PRL;
   in the authentication system, receiving an authorization request for the wireless communication device from the visited wireless communication network and denying the authorization request.

9. The method of claim 1, wherein the network controller is a base station controller.

10. The method of claim 1, wherein the network controller is a radio network controller.

11. A wireless communication system, comprising:
    a network controller that serves a geographic area of a home wireless communication network where a wireless communication device is located configured to receive an access request for the wireless communication device to access the home wireless communication network and transfer an authorization request for the wireless communication device to an authentication system;
    the authentication system configured to receive the authorization request, determine that the wireless communication device should not be allowed to access the home wireless communication network, and transfer an authentication response to the network controller indicating that the wireless communication device is not authorized to access the home wireless communication network;
    the network controller further configured to, in response to receiving the authentication response, transfer an access response to the wireless communication device that indicates that the wireless communication device is not authorized to access the home wireless communication network; and
    the wireless communication device configured to, in response to receiving the access response, block the use of a Preferred Roaming List (PRL) by the wireless communication device to access nodes of the network controller.

12. The wireless communication system of claim 11, wherein the wireless communication device is configured to block the use of the PRL by deleting entries in the PRL for the access nodes of the network controller.

13. The wireless communication system of claim 11, further comprising:
the network controller further configured to, in response to a determination that the wireless communication device is authorized to access the home wireless communication network, wherein the determination occurs at a time after the access response is transferred, transfer a message to the wireless communication device that indicates that the wireless communication device can access the home wireless communication network;
the wireless communication device further configured to, in response to receiving the message, unblock the use of the PRL by the wireless communication device to access nodes of the network controller.

14. The wireless communication system of claim 13, wherein the wireless communication device is configured to block the use of the PRL by deleting entries in the PRL for the access nodes of the network controller and to unblock the use of the PRL by receiving the entries in the PRL for the access nodes of the network controller that were previously deleted.

15. The wireless communication system of claim 14, wherein the wireless communication device is configured to receive the entries in the PRL over a visited wireless communication network.

16. The wireless communication system of claim 11, wherein the wireless communication device is configured to block the use of the PRL by preventing the wireless communication device from accessing entries in the PRL for the access nodes of the network controller.

17. The wireless communication system of claim 11, wherein the wireless communication device executes an application to block the use of the PRL.

18. The wireless communication system of claim 11, further comprising:
the wireless communication device configured to request access to a visited wireless communication network via an unblocked access node in the PRL;
the authentication system configured to receive an authorization request for the wireless communication device from the visited wireless communication network and deny the authorization request.

19. The wireless communication system of claim 11, wherein the network controller is a base station controller.

20. The wireless communication system of claim 11, wherein the network controller is a radio network controller.

* * * * *